(12) United States Patent
Keiser et al.

(10) Patent No.: US 6,372,805 B1
(45) Date of Patent: Apr. 16, 2002

(54) COLLOIDS COMPRISING AMORPHOUS BOROSILICATE

(75) Inventors: Bruce A. Keiser, Naperville, IL (US); James E. Whitten, Hudson, NH (US)

(73) Assignee: Nalco Chemical Company, Naperville, IL (US)

( * ) Notice: Subject to any disclaimer, the term of this patent is extended or adjusted under 35 U.S.C. 154(b) by 0 days.

(21) Appl. No.: 09/629,004

(22) Filed: Jul. 31, 2000

Related U.S. Application Data

(63) Continuation-in-part of application No. 08/940,888, filed on Sep. 30, 1997, now abandoned.

(51) Int. Cl.[7] .......................... C01B 33/20; C01B 35/00
(52) U.S. Cl. ...................... 516/79; 423/277; 423/326; 423/332
(58) Field of Search .................... 423/326, 332, 423/333, 277; 516/79, 81

(56) References Cited

U.S. PATENT DOCUMENTS

| | | | |
|---|---|---|---|
| 1,868,566 A | 7/1932 | Crossman | 428/452 |
| 2,047,016 A | 7/1936 | Elias | 106/601 |

(List continued on next page.)

FOREIGN PATENT DOCUMENTS

| | | |
|---|---|---|
| DE | 1045376 | 12/1958 |
| WO | WO96/30591 | 10/1996 |
| WO | WO97/16598 | 5/1997 |

OTHER PUBLICATIONS

"Synthesis of Spherical Sub–Micron Borosilicate Powders", by M.A. Harmer, *Journal of Materials Science Letters*, 14 (1995) 971–974 no month.

G.N. Sears, "Determination of Specific Surface Area of Colloidal Silica by Titration with Sodium Hydroxide", Jr. Anal. Chem., pp. 1981–1983, vol. 28 (1956) no month.

R.K. Iler, "The Chemistry of Silica", Wiley–Interscience Publication, J. Wiley & Sons, pp. 3–12(1979) no month.

R.K. Iler, et al., J. Phys. Chem., pp. 955–957, "Degree of Hydration of Particles of Colloidal Silica in Aqueous Solution", 60 (1956) no month.

R. Grant, et al., Grant & Hackh's Chem. Dictionary, pp. 128, 261–262, (1987) no month.

B. Weiner, Mod. Methods of Particle Size Analysis, pp. 93–116, "Particle Sizing Using Photon Correlation Spectroscopy" (1984) no month.

Irwin, et al., "Spectroscopic Investigations of Borosiloxane Bond Formation in the Sol–Gel Process", Journal of Non–Crystalline Solids, pp. 191–205, 89 (1987) no month.

Elvers, et al., Ullmann's Encyclopedia of Industrial Chemistry, Fifth Edition, vol. A12, Formamides to Hexamethylenediamine, pp. 366–368 & 376,379, 381 (1989) no month.

(List continued on next page.)

*Primary Examiner*—Ngoc-Yen Nguyen
(74) *Attorney, Agent, or Firm*—Margaret M. Brumm; Thomas M. Breininger

(57) ABSTRACT

Colloids comprising amorphous borosilicate particles, wherein said borosilicate particles are not borosilicate glass; are described and claimed. These colloids have been found to be useful in aqueous systems, specially in papermaking.

13 Claims, 2 Drawing Sheets

U.S. PATENT DOCUMENTS

| | | | |
|---|---|---|---|
| 2,106,744 A | 2/1938 | Hood et al. | 502/439 |
| 2,574,902 A | 11/1951 | Bechtold et al. | 516/81 |
| 2,801,938 A | 8/1957 | Her et al. | 423/338 |
| 2,919,222 A | 12/1959 | Hall, Jr. | 162/181.6 |
| 2,924,549 A | 2/1960 | Klein et al. | 162/162 |
| 2,943,970 A | 7/1960 | Allen | 162/181.6 |
| 3,607,774 A | 9/1971 | Cummings | 516/81 |
| 3,795,524 A * | 3/1974 | Sowman | 501/95.1 |
| 4,072,622 A | 2/1978 | Kühling et al. | 252/179 |
| 4,285,919 A | 8/1981 | Klotz et al. | 423/277 |
| 4,385,961 A | 5/1983 | Svending et al. | 162/175 |
| 4,388,150 A | 6/1983 | Suden et al. | 162/175 |
| 4,554,142 A | 11/1985 | Höelderich et al. | 423/701 |
| 4,643,801 A | 2/1987 | Johnson | 162/164.1 |
| 4,656,016 A | 4/1987 | Taramasso et al. | 423/705 |
| 4,753,710 A | 6/1988 | Langley et al. | 162/164.3 |
| 4,775,586 A | 10/1988 | Bohrn et al. | 428/324 |
| 4,780,423 A | 10/1988 | Bluestein et al. | 436/527 |
| 4,795,531 A | 1/1989 | Sofia et al. | 162/164.6 |
| 4,871,251 A | 10/1989 | Preikschat et al. | 356/336 |
| 4,902,326 A | 2/1990 | Jarmon | 65/442 |
| 4,902,382 A | 2/1990 | Sakabe et al. | 162/175 |
| 4,913,775 A | 4/1990 | Langley et al. | 162/164.3 |
| 4,954,220 A | 9/1990 | Rushmere | 162/168.3 |
| 5,053,211 A | 10/1991 | Haddad | 423/703 |
| 5,098,520 A | 3/1992 | Begala | 162/168.1 |
| 5,185,062 A | 2/1993 | Begala | 162/168.1 |
| 5,316,753 A | 5/1994 | Nakagawa | 423/706 |
| 5,430,074 A | 7/1995 | Barnes et al. | 523/115 |
| 5,766,528 A * | 6/1998 | Su et al. | 264/109 |

OTHER PUBLICATIONS

Sakka, et al., "Glasses From Metal Alcoholates", Journal of Non–Crystalline Solids, pp. 403–421, 42 (1980) no month.

Brinker, et al., "Sol–Gel Transition in Simple Silicates", Journal of Non–Crystalline Solids, pp. 47–64, 48 (1982) no month.

* cited by examiner

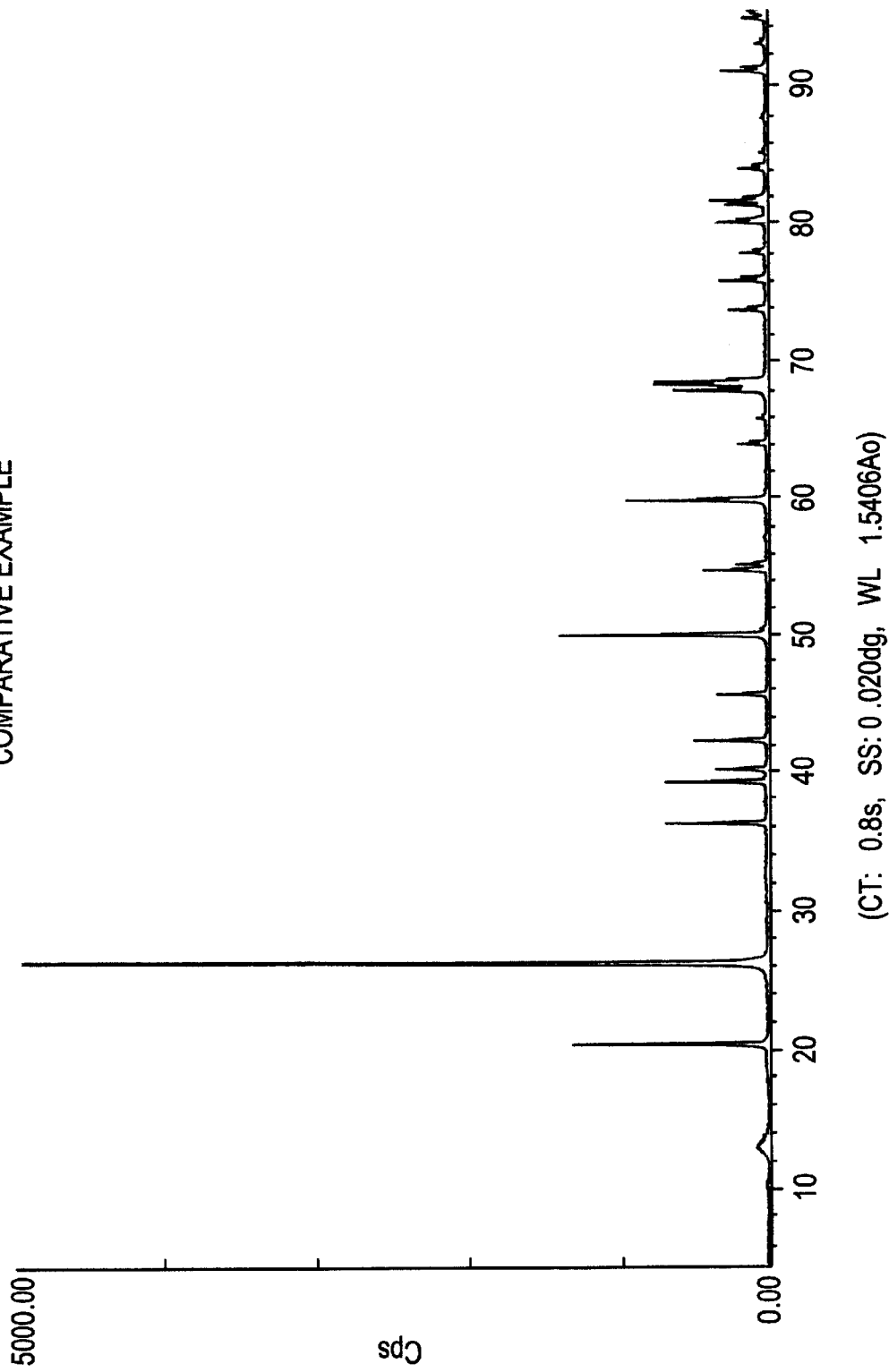

COLLOIDS COMPRISING AMORPHOUS BOROSILICATE

CROSS-REFERENCE TO RELATED PATENT APPLICATION

This patent application is a continuation-in-part patent application of U.S. patent application Ser. No. 08/940,888, filed Sep. 30, 1997 abandoned, USE OF COLLOIDAL BOROSILICATES IN THE PRODUCTION OF PAPER, now pending.

FIELD OF THE INVENTION

The invention relates to colloids containing particles of amorphous borosilicate.

BACKGROUND OF THE INVENTION

Borosilicates are compounds of the formula $nB_2O_3 \cdot m(SiO_2)$. The bonds between the atoms of a borosilicate are usually represented:

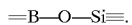

Known methods of manufacturing borosilicates include:

1) fusing suitable boron and silicon oxides at high temperatures to form compounds containing boron-oxygen-silicon bonds,
2) combining appropriate boron and silicon compounds under anhydrous conditions to form compounds containing boron-oxygen-silicon bonds, or
3) using both high temperatures and anhydrous conditions to make borosilicates.

In order to obtain stable boron-oxygen-silicon bonds, borosilicates made using these known methods are either crystalline or glass.

According to Iler, *The Chemistry of Silica*, ©1979 by John Wiley & Sons, Inc., page 410, "the Si—O—B bond is hydrolytically unstable". Further discussion on this point can be found in the article by Irwin et al., in *Journal of Non-Crystalline Solids*, 89 (1987) 191–205, entitled, "Spectroscopic Investigations of Borosiloxane Bond Formation in the Sol-Gel Process." On page 192 of the Irwin et al. article, it is stated, "In fact, borosiloxane bonds are known to be very easily broken by hydrolysis, and we know of no examples in the chemical literature where a =B—O—Si≡ containing compound is synthesized under other than anhydrous conditions." As stated previously, borosilicates formed in these high temperature and anhydrous processes have bonds that are hydrolyzable. As stated on page 197 of the Irwin et al. article, "Borosiloxane groups are known to be highly reactive toward hydrolysis, and are easily cleaved by water under neutral, acidic or basic conditions." The fact that the bonds in crystalline borosilicates are hydrolyzable means that the use of crystalline borosilicates in aqueous systems is limited. The fact that borosiloxane (B—O—Si) bonds are readily hydrolyzed has to date restricted the synthesis and use of aqueous colloids comprising borosilicate particles as well.

U.S. Pat. No. 4,902,326 issued to Jarmon discloses the use of a colloidal suspension of inorganic particles to make a fiber reinforced-glass matrix composite article. The source of colloids useful in the invention of Jarmon is not disclosed in the Patent, except for the "colloidal silica" being identified as Ludox™AS-40. Ludox™mAS-40 is an ammonium stabilized colloidal suspension of silica, not a colloid comprising amorphous borosilicate particles. There is no enablement for the "aqueous colloidal suspension of borosilicates" alleged to be useful in the invention of Jarmon. Furthermore, the invention of Jarmon is not an aqueous system where the boron-oxygen-silicon bond is going to be a limiting factor. Accordingly, any colloid used in the invention of Jarmon does not require non-hydrolyzable bonds.

Because of the desirability of using borosilicates in aqueous systems, it would be desirable to have a borosilicate composition of matter that is capable of retaining its functionality in aqueous systems without the bonds between the atoms being hydrolyzed.

SUMMARY OF THE INVENTION

The invention is a colloid comprising particles of amorphous borosilicate, wherein said particles of amorphous borosilicate are not borosilicate glass.

BRIEF DESCRIPTION OF THE DRAWINGS

FIG. 2 shows X-Ray Diffraction Data for a quartz material. Quartz is a known form of silicon dioxide, $SiO_2$. This diffraction pattern shows that the quartz is crystalline. This data is a comparative example, not an example of the instant claimed invention.

DETAILED DESCRIPTION OF THE INVENTION

Figure 1:
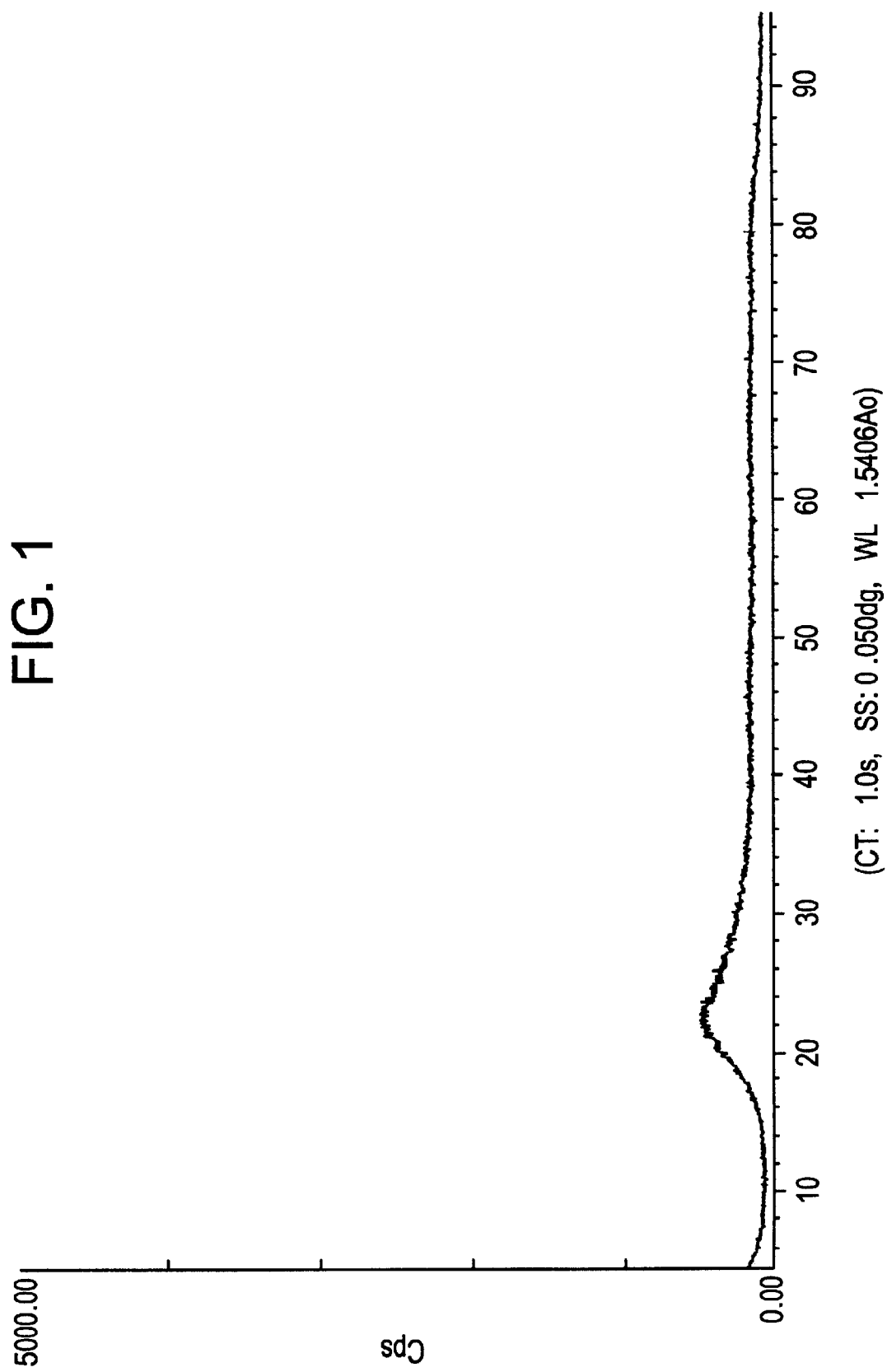
FIG. 1 shows X-Ray Scanning Diffraction data for amorphous borosilicate particles from a colloid of the instant claimed invention. This diffraction pattern shows the particles are amorphous.

"nm" refers to nanometer.

"amorphous" refers to a solid substance that is without a definable repeating order of atoms. Amorphous materials do not have a definite geometrical shape.

"Eka" refers to Eka Nobel of Surte, Sweden.

"Borosilicates" are compounds that can be represented by the formula $nB_2O_3 \cdot m(SiO_2)$, where n and m represent the weight percent of each component, and where n and m have to add up to 100.

"Borosilicate glass" is an amorphous, highly viscous liquid, with the appearance of a solid material. Borosilicate glass is a hard, brittle, often transparent material typically containing about 80.5 wt. % $SiO_2$, 2.4% $Al_2O_3$, 12.9 wt. % $B_2O_3$, 3.8% $Na_2O$ and 0.4 wt. % CaO. Density at room temperature is about 2.25 and the melting point is 730° C. All glasses are amorphous, but not all amorphous materials are glass. In order to be a borosilicate glass, the raw materials used in the making of borosilicate have to be raised above their glass transition temperature (typically 730° C.) and "rapidly" cooled to generate a "highly viscous" liquid during manufacture. The high temperature serves to fuse the mixtures of appropriate oxides and bring about the formation of =B—O—Si≡ bonds.

In contrast, colloids comprising amorphous borosilicate particles are best described as "amorphous solid borosilicate particles dispersed in an aqueous continuous phase".

The particles of borosilicate in the colloids of the instant claimed invention are amorphous solids. As such, the solid particles of borosilicate found in the colloids of the instant claimed invention are amorphous, but not glass.

FIG. 1 shows X-Ray Scanning Diffraction data for the particles of amorphous borosilicate present in the colloids of the instant claimed invention. The lack of features in the diffraction pattern clearly shows the amorphous character of the borosilicate. In contrast, FIG. 2 shows X-Ray Scanning Diffraction pattern data for particles of quartz, which is a crystalline form of silicon dioxide. The X-Ray Scanning Diffraction pattern show the presence of "order" indicative of a crystal. Quartz is not an example of the instant claimed invention.

The particles of amorphous borosilicate present in the colloids of the instant claimed invention have a mole ratio of boron to silicon of from about 1:1000 to about 100:1; preferably from about 1:100 to about 2:5. The mole ratio of alkali metal, preferably sodium, to silicon in the particles of amorphous borosilicate present in the colloids of this invention ranges from about 6:1000 to about 1.04:1; preferably from about 1:100 to about 7:1.

The colloids comprising amorphous borosilicate particles have an appearance ranging from a colorless, slightly turbid liquid to a milky white liquid depending upon the particle size of the amorphous borosilicate particles. The pH of the colloids is from about 8.00 to about 11.00, preferably from about 8.80 to about 10.70 (measured at 25° C.).

Dynamic Light Scattering (DLS) or Photon Correlation Spectroscopy (PCS) has been used to measure particle size in the submicron range since as early as 1984. An early treatment of the subject is found in "Modern Methods of Particle Size Analysis", H.Barth, editor, Wiley, N.Y., 1984. The method consists of filtering a small volume of the sample through a 0.45 micron membrane filter to remove stray contamination such as dust or dirt. The sample is then placed in a cuvette, which in turn is placed in the path of a focused laser beam. The scattered light is collected at 90° to the incident beam and analyzed to yield the average particle size. The present work used a Coulter® N4 unit, commercially available from Coulter Corporation, Scientific Instruments.

Using the Coulter® N4 unit and the measuring technique described in the preceding paragraph, the amorphous borosilicate particles in the colloids of the instant claimed invention have been found to have a particle size from about 3 nm to about 2000 nm; preferably from about 4 nm to 500 nm, more preferably from about 4 nm to 100 nm and most preferably from about 4 to about 80 nm.

The surface area of the amorphous borosilicate particles reported herein is obtained by measuring the adsorption of base on the surface of sol particles. The technique was first applied to silica sols by Sears and is described in *Analytical Chemistry*, 28 (12), 1981–1983 (1956). While the method outlined therein is specific to colloids having a surface composed solely of silanol groups, the general technique of acid-base titration can be applied to the colloids of the instant claimed invention. The method involves the titration of surface hydroxyl groups with a standard solution of sodium hydroxide, of a known amount of silica (i.e., grams), in a saturated sodium chloride solution. The resulting volume of titrant is converted to surface area.

The surface area of the amorphous borosilicate particles in the colloids of the instant claimed invention is in the range of from about 15 $m^2/g$ to about 3000 $m^2/g$, preferably from about 50 $m^2/g$ to about 3000 $m^2/g$, more preferably from about 100 $m^2/g$ to about 2000 $m^2/g$ and most preferably from about 600 $m^2/g$ to about 1500 $m^2/g$.

Another characteristic of colloids in general is the amount of space occupied by the dispersed phase. One method for determining this space factor, characterized as the "S-value" was first developed by R. Iler and R. Dalton and reported in *J. Phys. Chem.*, 60(1956), 955–957. In colloidal silica systems, it has been shown that the S-value relates to the degree of aggregation formed within the product. A lower S-value indicates a greater volume is occupied by the same weight of colloidal silica. The colloids comprising amorphous borosilicate particles of the instant claimed invention have an S-value of from about 10 to about 80, preferably from about 15 to about 50, and most preferably from about 13 to about 40.

The colloids comprising particles of amorphous borosilicate, of the instant claimed invention, can be prepared by reacting an alkali metal salt of a boron containing compound with silicic acid under conditions resulting in the formation of a colloid according to the following process:

(a) contacting a dilute aqueous solution of an alkali metal silicate with a cation exchange resin to produce a silicic acid solution;

(b) forming an aqueous $B_2O_3$ solution by mixing together a dilute aqueous solution of an alkali metal borate with an alkali metal hydroxide to form an aqueous $B_2O_3$ solution comprising from about 0.01 to about 30 weight percent $B_2O_3$, having a pH of from about 6 to about 14;

(c) adding said silicic acid solution to said aqueous $B_2O_3$ solution with optional agitation; and then;

(d) recovering a colloid comprising amorphous borosilicate particles wherein said borosilicate particles are not borosilicate glass.

The first step in this process is the preparation of a silicic acid solution . This may be advantageously accomplished by contacting an alkali metal silicate solution with a commercial cation exchange resin, with the commercial cation exchange resin being in the hydrogen form, and recovering a dilute solution of silicic acid. The alkali metal silicate solution is preferably a dilute solution of the alkali metal silicate. The concentration of the silicic acid solution used is generally from about 1 to about 11 percent by weight $SiO_2$, preferably from about 1 to about 9 weight percent $SiO_2$ and more preferably from about 2 to about 7 percent by weight $SiO_2$ .

The commercial cation exchange resin is preferably a so called strong acid resin.

The next step in the process is forming an aqueous $B_2O_3$ solution by mixing together a dilute aqueous solution of an alkali metal borate with an alkali metal hydroxide to form an aqueous $B_2O_3$ solution comprising from about 0.01 to about 30 weight percent $B_2O_3$, having a pH of from about 6 to about 14;

The weight percent of the alkali metal borate solution used is from about 0.01 weight percent to about 30 weight percent and preferably from about 0.4 weight percent to about 20 weight percent as $B_2O_3$.

It is believed that any soluble alkali metal borate salt may be employed in the practice of this invention. The preferred alkali metal borate is sodium borate. Commercial borax, sodium tetraborate decahydrate, or sodium tetraborate pentahydrate are the preferred materials in the process of making the colloids of the instant claimed invention because of the ready availability of these materials and their low cost.

Within the pH range of from about 6 to about 14, the pH is preferably from about 7.5 to about 10.5 and more preferably from about 8 to about 9.5. The pH is adjusted to the desired level by adding appropriate amounts of an alkali metal hydroxide to the reaction mixture. The alkali metal hydroxide is preferably sodium hydroxide.

The silicic acid solution is then added to the aqueous $B_2O_3$ solution, with optional agitation.

It is believed that agitation, rate of addition, and other parameters are non-critical to the formation of the colloidal borosilicate compositions of the invention.

A colloid comprising amorphous borosilicate particles is recovered. Because this process is not conducted above the glass transition temperature of boron and silicate, the amorphous borosilicate particles in the colloid are not a viscous liquid or glass but, instead, are a non-crystalline solid.

In an alternative procedure, the alkali metal borate and the silicic acid may be added simultaneously to prepare the colloids comprising amorphous solid particles of borosilicate and not a particles of viscous borosilicate liquid or borosilicate glass.

Other methods of preparing the colloids comprising amorphous borosilicate particles of this invention may also be used, providing they do not require a temperature above the glass transition temperature of boron and silicon and also providing these alternative methods are not conducted under anhydrous conditions.

Once created, these colloids comprising amorphous borosilicate particles have been found to be useful in improving the production of paper. Preferably, the colloids comprising amorphous borosilicate particles are synthesized and then added to the papermaking process as liquids. It is possible, though not preferred, to evaporate the water from the colloids, leaving only dry amorphous borosilicate particles. These dry amorphous borosilicate particles, that are not particles of borosilicate glass, can also be used in papermaking. It is critical that when the water is evaporated, that the temperature used is much lower than the glass transition temperature of the boron and silicate. If the glass transition temperature is exceeded, then instead of dry, solid amorphous borosilicate particles; borosilicate glass would be obtained. Borosilicate glass particles do not work as well in papermaking as do colloids comprising amorphous borosilicate particles that are not glass.

The following examples are presented to describe preferred embodiments and utilities of the invention and are not meant to limit the invention unless otherwise stated in the claims appended hereto.

EXAMPLES

Examples 1–23

Each of the Examples shown in Table I below was prepared using the following general procedure and varying the relative amounts of reagents.

Silicic acid was prepared following the general teaching of Bechtold et al., U.S. Pat. No. 2,574,902. A commercially available sodium silicate available from OxyChem, Dallas, Tex. having a silicon dioxide content of about 29% by weight and a sodium oxide content of about 9% by weight was diluted with deionized water to a silicon dioxide concentration of from about 8 to about 9% by weight.

A cationic exchange resin such as Dowex® HGR-W2H or Monosphere™ 650C, both available from Dow Chemical Company, Midland, Mich. was regenerated to the hydrogen form via treatment with mineral acid following well established procedures. The resin was rinsed following regeneration with deionized water to insure complete removal of excess regenerant. The dilute silicate solution was then passed through a column of the regenerated washed resin. The resultant silicic acid was collected.

Simultaneously, an appropriate amount of borax solution (reagent grade sodium tetraborate decahydrate) was combined with an appropriate amount of aqueous sodium hydroxide to form an aqueous $B_2O_3$ solution for the reaction. Optionally, water may be added to the aqueous $B_2O_3$ solution to insure adequate volume during the early stages of formation.

Freshly prepared silicic acid was then added to the aqueous $B_2O_3$ solution with agitation at room temperature. Agitation was continued for 60 minutes after complete addition of the silicic acid.

The resulting colloids comprising amorphous borosilicate particles may be used immediately, or stored for later use. These colloids have been found to be stable at room temperature storage for at least about one year.

The table below gives amounts of silicic acid, sodium hydroxide, and sodium tetraborate decahydrate (borax) as well as pH for each Example conducted.

TABLE I

Colloids Comprising Amorphous Borosilicate Particles

| Example | Borax | NaOH | Acid Sol** | B/Si | Na/Si | Final pH |
|---|---|---|---|---|---|---|
| 1 | 0.025 M(50 mL) | 0.1 M(18.3 mL) | 130 mL of 1.032 g/mL | 0.042 | 0.037 | 8.5 |
| 2 | 0.025 M(50 mL) | 0.1 M(18.5 mL) | 140 mL of 1.046 g/mL | 0.028 | 0.025 | 8.0 |
| 3 | 0.025 M(50 mL) | 0.1 M(18.5 mL) | 140 mL of 1.032 g/mL | 0.039 | 0.034 | 8.0 |
| 4 | 0.025 M(50 mL) | 0.1 M(22.7 g) | 140 mL of 1.045 g/mL | 0.028 | 0.027 | 8.5 |
| 5 | 0.025 M(50 mL) | 0.1 M(24.3 g) | 140 mL of 1.043 g/mL | 0.029 | 0.029 | 9.4 |
| 6 | 0.1 M(50 mL) | 1.0 M(9.7 mL) | 140 mL of 1.043 g/mL | 0.117 | 0.116 | 9.4 |
| 7 | 0.1 M(50 mL) | 1.0 M(9.7 mL) | 140 mL of 1.046 g/mL | 0.109 | 0.107 | 9.2 |
| 8 | 0.1 M(27.6 mL) | 1.0 M(10.9 mL) | 140 mL of 1.046 g/mL | 0.063 | 0.062 | 8.7 |
| 9* | — | — | 249 g of 1.047 g/mL | 0 | 0.208 | — |
| 10 | 0.1 M(50 mL) | 1.0 M(9.7 g) | 70 mL of 1.045 g/mL | 0.223 | 0.220 | 9.5 |
| 11 | 0.1 M(50 mL) | 1.0 M(9.7 g) | 70 mL of 1.045 g/mL | 0.223 | 0.220 | 9.5 |
| 12 | 0.1 M(50 mL) | 1.0 M(9.7 g) | 105 mL of 1.045 g/mL | 0.149 | 0.146 | 9.2 |
| 13 | 0.1 M(446 mL) | 4.57 mL of 50 wt % NaOH | 1343 mL of 1.040 g/mL | 0.117 | 0.115 | 9.1 |

TABLE I-continued

Colloids Comprising Amorphous Borosilicate Particles

| | | Amts Used | | Molar Ratio | | Final |
|---|---|---|---|---|---|---|
| Example | Borax | NaOH | Acid Sol** | B/Si | Na/Si | pH |
| 14 | 0.1 M(223 mL) | 2.39 mL of 50 wt % NaOH | 1307 mL of 1.040 g/mL | 0.063 | 0.062 | 8.5 |
| 15 | 0.1 M(50 mL) | 1.0 M(24.3 mL) | 150 mL of 1.040 g/mL | 0.117 | 0.201 | 9.9 |
| 16 | 0.1 M(100 mL) | 2.0 mL of 50 wt % NaOH | 100 mL of 1.040 g/mL | 0.352 | 0.510 | 10.6 |
| 17 | 0.1 M(100 mL) | 2.0 mL of 50 wt % NaOH | 50 mL of 1.040 g/mL | 0.704 | 1.02 | 11.1 |
| 18 | 0.1 M(17 mL) | 200 mL of 50 wt % NaOH | 150 mL of 1.040 g/mL | 0.039 | 0.242 | 11.0 |
| 19 | 0.1 M(50 mL) | 2.0 mL of 50 wt % NaOH | 150 mL of 1.040 g/mL | 0.117 | 0.281 | 10.7 |
| 20 | 0.1 M(500 mL) | 12.81 mL of 50 wt % NaOH | 1500 mL of 1.040 g/mL | 0.117 | 0.202 | 10.1 |
| 21 | 0.1 M(500 mL) | 12.81 mL of 50 wt % NaOH | 1500 mL of 1.040 g/mL | 0.117 | 0.202 | 10.1 |
| 22 | 0.1 M(50 mL) | 1.0 M(24.3 mL) | 150 mL of 1.040 g/mL | 0.117 | 0.201 | 10.1 |
| 23 | 0.1 M(50 mL) | 1.0 M(9.7 g) | 150 mL of 1.040 g/mL | 0.117 | 0.116 | 8.9 |

*Example 9 is a comparative example, not an example of this invention. Example 9 was made by carrying out the synthesis without borax present. A colloidal silica was prepared by taking 9.68 g of a commercially available sodium silicate and diluting with 22 g of water. The mixture was agitated with a magnetic stir bar and brought to room temperature of about 25° C. Where upon, silicic acid, 249 g with a specific gravity of 1.047, was added over a 40 minute period. Once all of the silicic acid was added to the reaction mixture, agitation continued for an additional hour. The colloidal silica formed contained 8.26% by weight $SiO_2$.
**This column reports the acid sol volume and specific gravity at 25° C. as measured by hydrometer.

Property comparison of colloids comprising amorphous borosilicate particles of the instant claimed invention relative to other commercial and research samples of materials are included in Table II below.

TABLE II

Property Comparisons

| Sample Id. | S.A. ($m^2/g$) | S-Value | DLS Dia. (nm) |
|---|---|---|---|
| 8671[1] | 700 | 63.5 | 12.6 |
| BMA 0[2] | | 65.7 | |
| BMA 670[2] | 489 | 32.6 | 15.4 |
| BMA 780[2] | 435 | 21.6 | 145 |
| Example 13 | 1210 | 24.2 | 56.2 |
| Example 8 | 1052 | 37.1 | 61.1 |
| ACS4[a] | 619 | 98 | 4.5 |
| ACS5[a] | 545 | 47 | 13 |
| ACS6[a] | 500 | 31 | 17 |
| Sample 1[b] | | 50 | 4.6 |
| Sample 2[b] | | 37 | 13.3 |
| Sample 3[b] | | 31 | 16.5 |
| Example 20 | | 35.6 | 58.5 |

[1]8671 is Nalco ® 8671, a commercially available colloidal silica. This material has an average particle size of 4 nm, a surface area of 750 $m_2/g$, and about 15% by weight $SiO_2$.
[2]BMA 0 is a colloidal silica sol available from Eka
BMA 670 is a colloidal silica sol available from Eka
BMA 780 is a colloidal aluminum coated silica sol available from Eka
[a]Reference: Nordic Pulp and Paper, 11 (1), (1996), 15.
[b]Reference: Colloids and Surfaces A, 118, (1996), 89.
Definition:
S.A. = Surface Area as determined via method described below.
DLS = Dynamic Light Scattering is a method used to determine average particle size as described previously.

Changes can be made in the composition, operation and arrangement of the method of the present invention described herein without departing from the concept and scope of the invention as defined in the following claims.

What is claimed is:

1. An aqueous colloid comprising amorphous borosilicate particles, wherein said amorphous borosilicate particles are not borosilicate glass and wherein said amorphous borosilicate particles have a mole ratio of alkali metal to silicon of from about 6:1000 to about 1.04:1.

2. The aqueous colloid of claim 1 wherein the particle size of said amorphous borosilicate particles is from about 3 nm to about 2000 nm.

3. The aqueous colloid of claim 1 wherein the particle size of said amorphous borosilicate particles is from about 4 nm to about 500 nm.

4. The aqueous colloid of claim 1 wherein the particle size of said amorphous borosilicate particles is from about 4 nm to about 100 nm.

5. The aqueous colloid of claim 1 wherein the particle size of said amorphous borosilicate particles is from about 4 nm to about 80 nm.

6. The aqueous colloid of claim 1 wherein said amorphous borosilicate particles have a surface are of from about 15 $m^2/g$ to about 3000 $m^2/g$.

7. The aqueous colloid of claim 1 wherein said amorphous borosilicate particles have a surface area of from about 50 $m^2/g$ to about 3000 $m^2/g$.

8. The aqueous colloid of claim 1 wherein said amorphous borosilicate particles have a surface area of from about 100 $m^2/g$ to about 2000 $m^2/g$.

9. The aqueous colloid of claim 1 wherein said amorphous borosilicate particles have a surface area of from about 600 $m^2/g$ to about 1500 $m^2/g$.

10. The aqueous colloid of claim 1 wherein said amorphous borosilicate particles have a mole ratio of boron to silicon of from about 1:1000 to about 100:1.

11. The aqueous colloid of claim 1 wherein said amorphous borosilicate particles have a mole ratio of boron to silicon of from about 1:100 to about 2:5.

12. The aqueous colloid of claim 1 wherein said amorphous borosilicate particles have a mole ratio of alkali metal to silicon of from about 1:100 to about 7:1.

13. The aqueous colloid of claim 1 prepared by
(a) contacting a dilute aqueous solution of an alkali metal silicate with a cation exchange resin to produce a silicic acid solution;
(b) forming an aqueous $B_2O_3$ solution by mixing together a dilute aqueous solution of an alkali metal borate with an alkali metal hydroxide to from an aqueous $B_2O_3$ solution comprising from about 0.01 to about 30 weight percent $B_2O_3$, having a pH of from about 6 to about 14;
(c) adding said silicic acid solution to said aqueous $B_2O_3$ solution with optional agitation; and then
(d) recovering an aqueous colloid comprising amorphous borosilicate particles wherein said amorphous borosilicate particles are not borosilicate glass and wherein said amorphous borosilicate particles have a mole ratio of alkali metal to silicon of from about 6:1000 to about 1.04:1.

\* \* \* \* \*